US008167127B2

(12) United States Patent
Martin et al.

(10) Patent No.: US 8,167,127 B2
(45) Date of Patent: May 1, 2012

(54) PROTECTIVE CARRYING CASE FOR A PORTABLE ELECTRONIC DEVICE

(75) Inventors: Edward Martin, Hollywood, FL (US); Christopher Piedra, Hollywood, FL (US)

(73) Assignee: Marware Inc., Hollywood, FL (US)

( * ) Notice: Subject to any disclaimer, the term of this patent is extended or adjusted under 35 U.S.C. 154(b) by 5 days.

(21) Appl. No.: 12/751,415

(22) Filed: Mar. 31, 2010

(65) Prior Publication Data

US 2010/0243516 A1 Sep. 30, 2010

Related U.S. Application Data

(60) Provisional application No. 61/165,278, filed on Mar. 31, 2009.

(51) Int. Cl.
*B65D 85/00* (2006.01)
(52) U.S. Cl. ......... 206/320; 224/669; 224/269; 224/930
(58) Field of Classification Search .................. 206/320, 206/305; 224/666, 669, 930, 269
See application file for complete search history.

(56) References Cited

U.S. PATENT DOCUMENTS

| 4,828,153 | A | | 5/1989 | Guzik et al. | |
| 5,261,122 | A | * | 11/1993 | Otsuki et al. | 455/351 |
| 5,385,282 | A | * | 1/1995 | Chen | 224/669 |
| 6,443,343 | B2 | * | 9/2002 | Kamiya | 224/269 |
| 6,550,655 | B2 | * | 4/2003 | Warner | 224/575 |
| 6,626,336 | B1 | * | 9/2003 | Krusell | 224/271 |
| 7,343,184 | B2 | * | 3/2008 | Rostami | 455/575.8 |
| D582,149 | S | | 12/2008 | Tan | |
| 7,612,997 | B1 | * | 11/2009 | Diebel et al. | 361/679.56 |
| D624,909 | S | * | 10/2010 | Huskinson | D14/250 |
| 2003/0068035 | A1 | * | 4/2003 | Pirila et al. | 379/447 |
| 2004/0097276 | A1 | * | 5/2004 | Harmon | 455/575.1 |
| 2004/0149797 | A1 | * | 8/2004 | Urleb et al. | 224/668 |
| 2005/0115999 | A1 | * | 6/2005 | Johnson | 224/269 |
| 2006/0081666 | A1 | | 4/2006 | Chee | |
| 2006/0100005 | A1 | * | 5/2006 | Chen et al. | 455/575.8 |
| 2006/0243772 | A1 | | 11/2006 | Sirichai et al. | |
| 2007/0163904 | A1 | | 7/2007 | Martin et al. | |
| 2007/0165371 | A1 | | 7/2007 | Brandenburg | |
| 2008/0023508 | A1 | * | 1/2008 | Harchol | 224/183 |
| 2008/0029413 | A1 | | 2/2008 | Brandenburg | |
| 2008/0110946 | A1 | * | 5/2008 | Dixon et al. | 224/197 |

(Continued)

FOREIGN PATENT DOCUMENTS

EP 1719433 A1 11/2006

*Primary Examiner* — David Fidei
(74) *Attorney, Agent, or Firm* — Laurence A. Greenberg; Werner H. Stemer; Ralph E. Locher

(57) ABSTRACT

A casing for a portable electronic device, such as an MP3 player, a cell phone, a smart phone, or a PDA, is formed with two or more sleeves that may be placed onto the electronic device and together form a closed encasement for the electronic device. The encasement is formed to enable operative access to the electronic device while the sleeves are connected to form the closed encasement. A back panel of the encasement is removable so that it may be exchanged for an alternative panel. That is, a first back panel may simply be a planar panel that only forms an integral backwall part of the closed encasement and a second back panel may be provided with a belt clip or belt loop, or the like. The different removable back panels may thus be exchanged to provide the device for mutually different functions of the casing.

4 Claims, 5 Drawing Sheets

U.S. PATENT DOCUMENTS

| | | |
|---|---|---|
| 2008/0119244 A1 | 5/2008 | Malhotra |
| 2008/0251512 A1 | 10/2008 | Griffin et al. |
| 2008/0314941 A1 | 12/2008 | Knych et al. |
| 2009/0084705 A1 | 4/2009 | Justiss |
| 2009/0114556 A1* | 5/2009 | Tai et al. ............. 206/320 |
| 2010/0302716 A1* | 12/2010 | Gandhi ............. 361/679.01 |

* cited by examiner

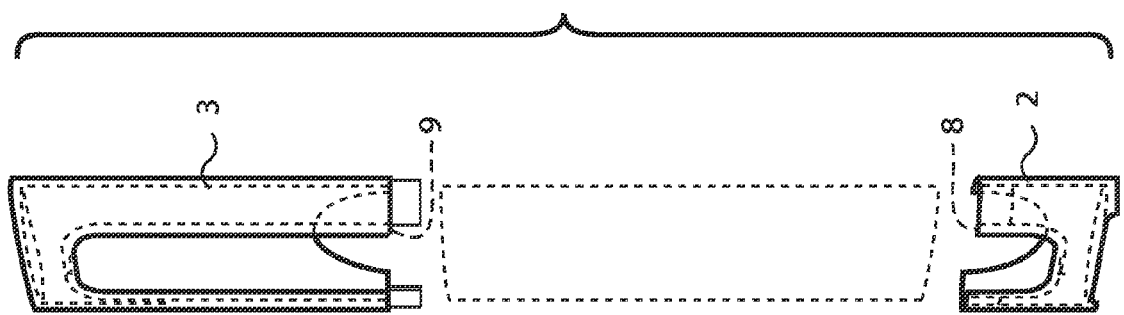

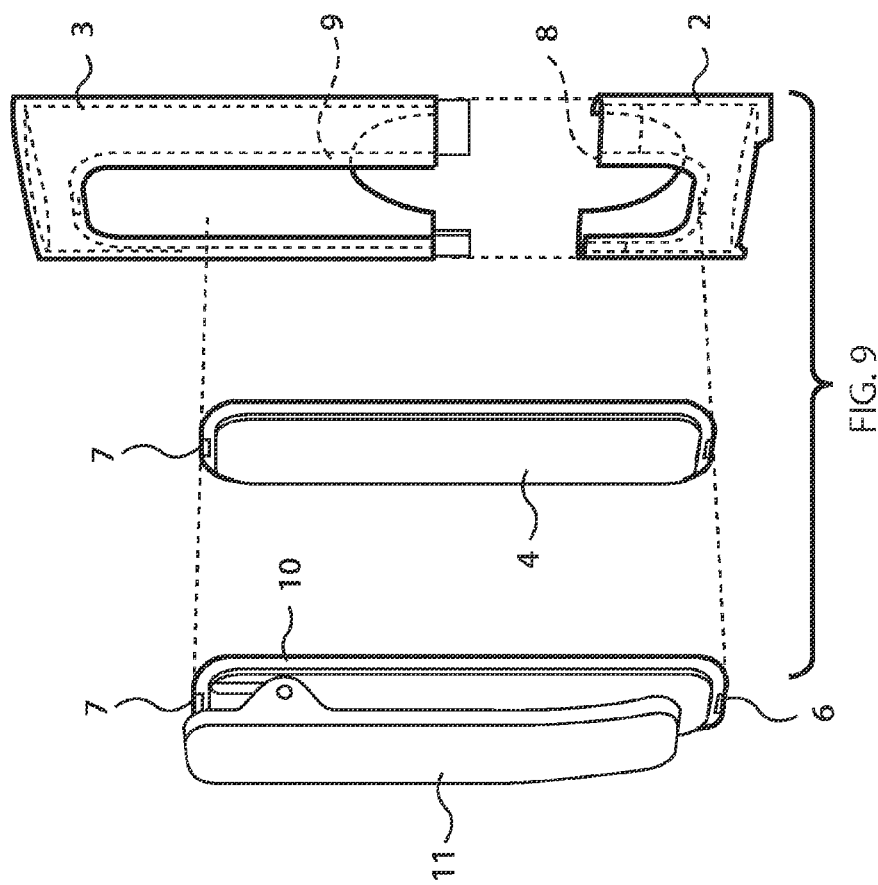
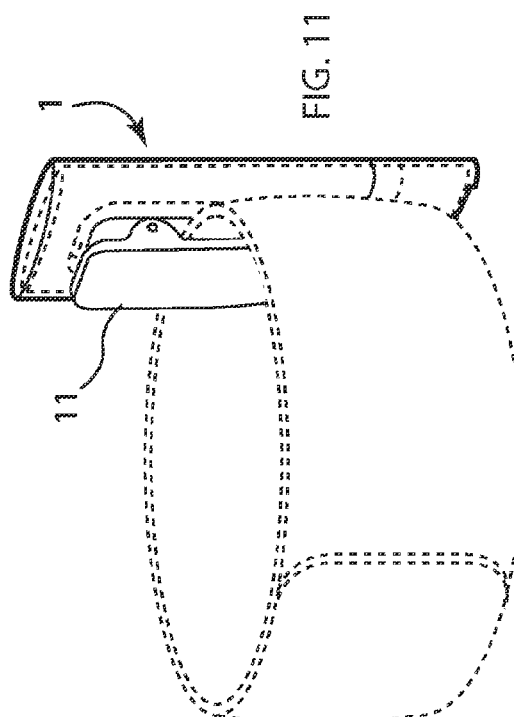
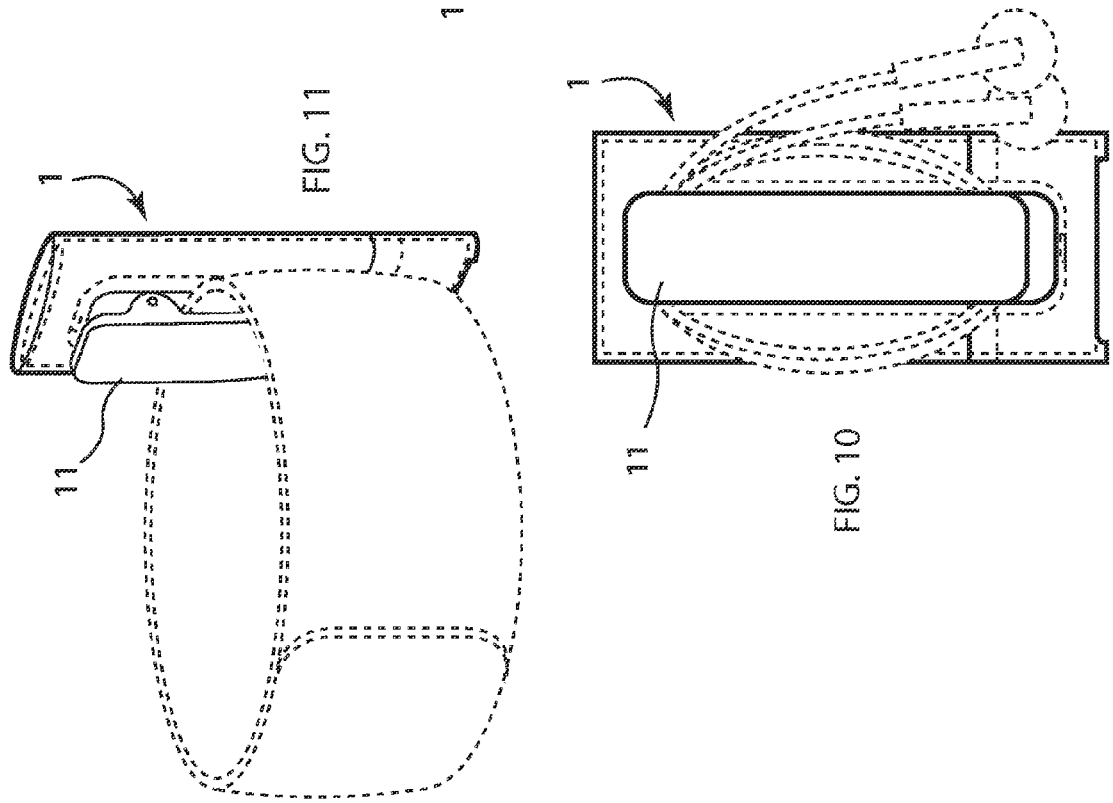

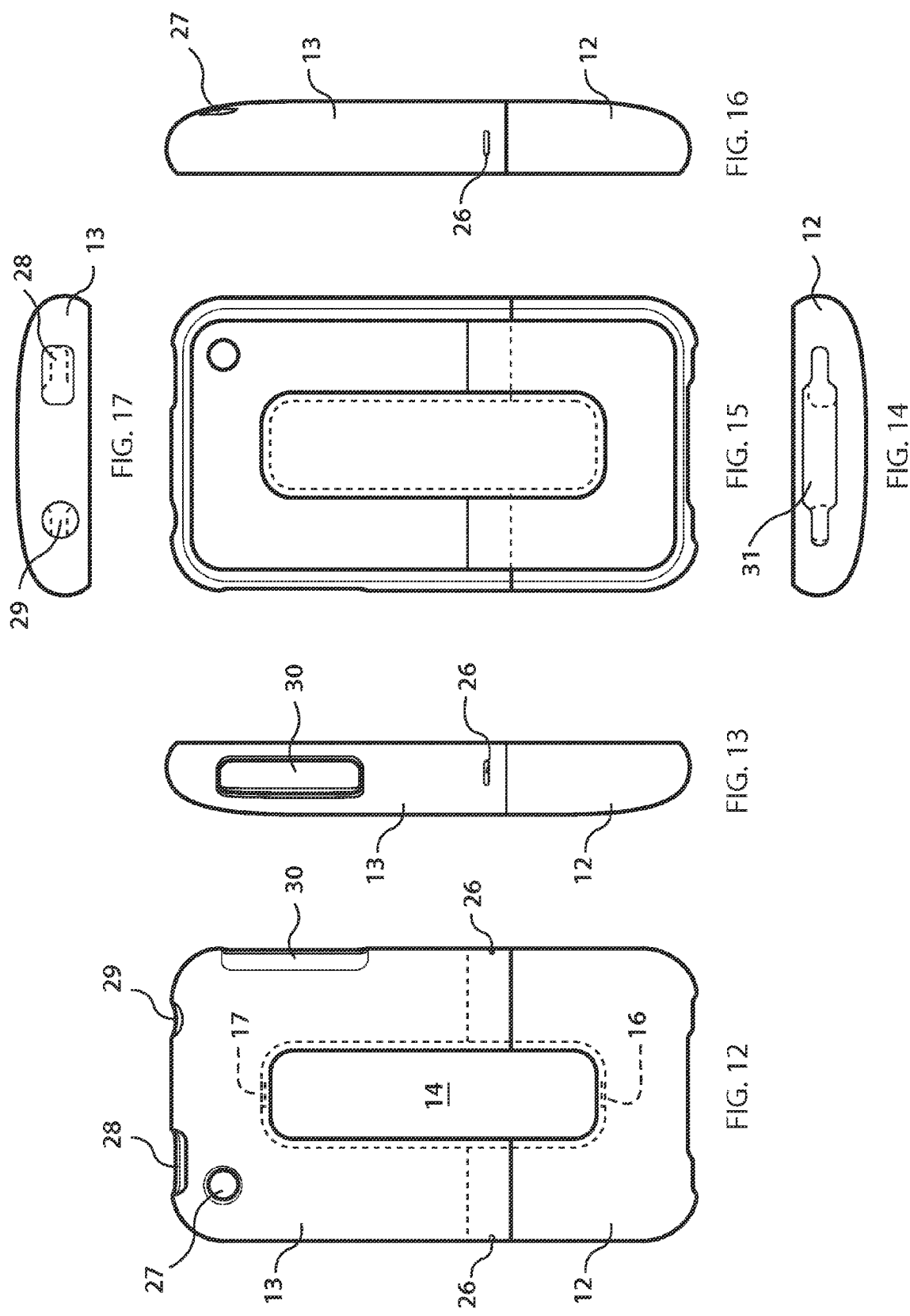

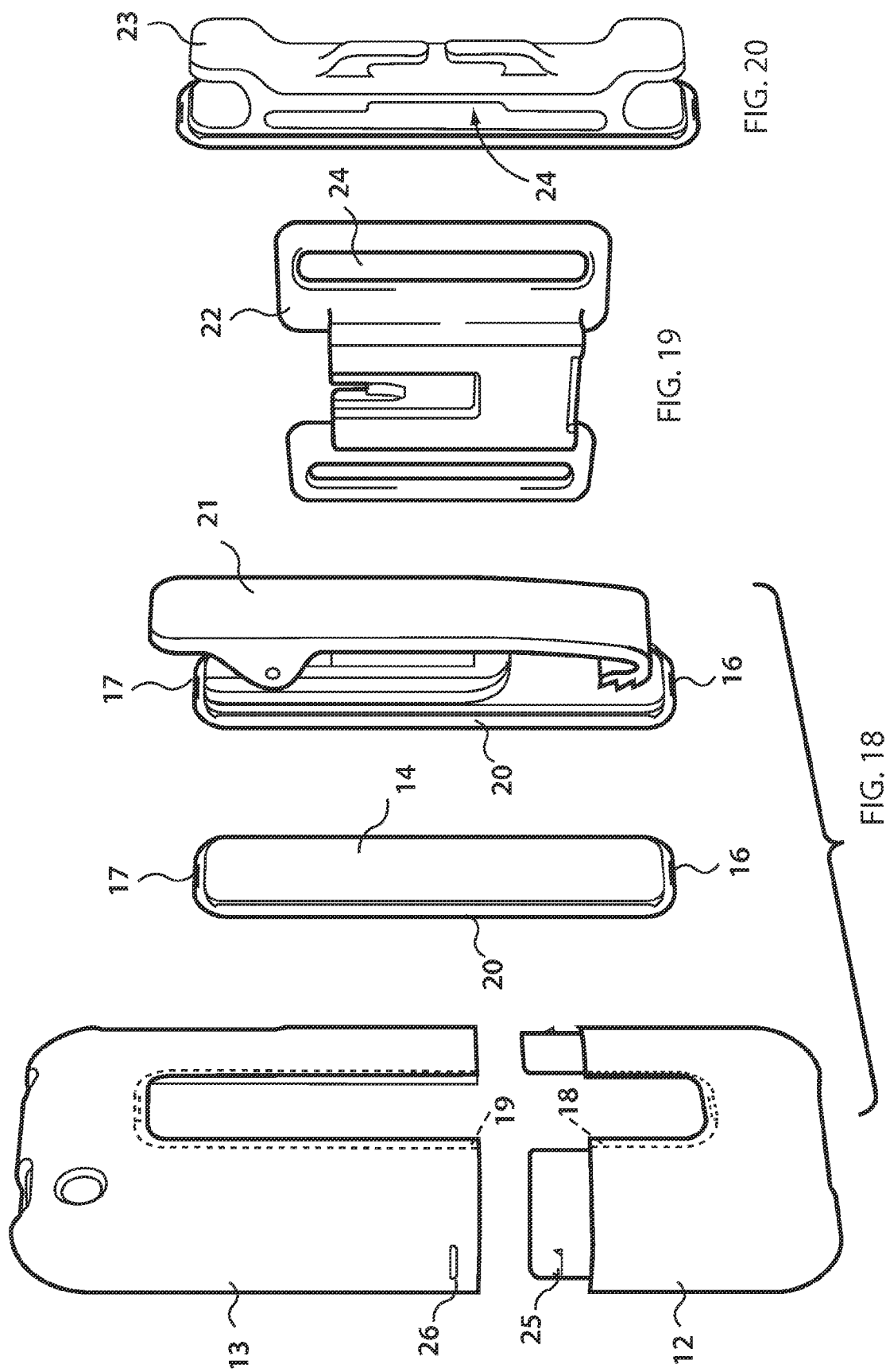

US 8,167,127 B2

PROTECTIVE CARRYING CASE FOR A PORTABLE ELECTRONIC DEVICE

CROSS-REFERENCE TO RELATED APPLICATION

This application claims the benefit, under 35 U.S.C. §119(e), of copending provisional patent application No. 61/165,278, filed Mar. 31, 2009.

BACKGROUND OF THE INVENTION

Field of the Invention

The invention relates to a protective case for a portable electronic device such as a digital music player (e.g., iPod®) or a cellular telephone, smart phone (e.g., iPhone®), and/or PDA.

Cell phone cases and iPod cases come in a variety of forms. Depending on the intended use, the case may simply be a protective shell or sleeve, or it may be provided with a belt loop for attachment to a belt or an arm strap, or it may be provided with a belt clip.

If a different use is intended, therefore, the device must be placed in a different case. It would be desirable to have a case that is suitable for many or most different uses with only minor modification.

BRIEF SUMMARY OF THE INVENTION

It is accordingly an object of the invention to provide a protective case for a portable electronic device, which overcomes the above-mentioned disadvantages of the heretofore-known devices and methods of this general type and which may be easily adapted to any of a number of different uses.

With the foregoing and other objects in view there is provided, in accordance with the invention, a function-convertible casing for a portable electronic device, comprising:

a plurality of sleeves to be placed onto the electronic device and together forming a closed encasement for the electronic device when the sleeves are placed on the electronic device;

at least one of the sleeves being formed to enable operative access to the electronic device while the sleeves are connected to form the closed encasement; and a plurality of removable back panels including a substantially planar first back panel forming an integral backwall part of the closed encasement and a second back panel carrying an attachment device for carrying the encasement with the electronic device disposed therein, wherein the plurality of removable back panels may be exchanged to provide the device for mutually different functions of the casing.

In accordance with an added feature of the invention, the removable back panel and the sleeves are formed with snap connections holding the sleeves in place on the electronic device to maintain the closed encasement.

In accordance with an additional feature of the invention, the sleeves are formed with snap connections enabling the sleeves to engage with one another in a position when the sleeves are assembled to form the closed encasement.

In accordance with another feature of the invention, the sleeves are formed with respective openings in their backwalls. The openings together form a backwall opening of the casing when the sleeves are assembled to form the closed encasement. The back panel is formed to completely close the backwall opening.

In accordance with a concomitant feature of the invention, the openings in said sleeves are formed with an undercut forming a slide track and the back panel is formed with a marginal slide bulge configured to slidably engage in the slide track.

Other features which are considered as characteristic for the invention are set forth in the following description of two exemplary embodiments and in the appended claims.

Although the invention is illustrated and described herein as embodied in a protective casing for a portable electronic device, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE SEVERAL VIEWS OF THE DRAWING

FIG. 5 is a front perspective view of the closed casing with an iPod inside and functionally accessible through a front opening;

FIG. 6 is a similar perspective view with the upper shell of the casing being slid upwardly and the latching connection between the lower and upper shell part unlatched;

FIG. 7 is a rear perspective view thereof, illustrating the slidability of the back panel;

FIG. 8 is an exploded view showing the three parts, namely, the lower and upper shells and the back panel that together form the complete encasement;

FIG. 9 is an exploded view showing the upper and lower shells of the casing with a flat backwall panel and a replacement panel with a belt clip;

FIG. 10 is a rear view of the encasement with the belt clip back panel used for cord and ear bud management;

FIG. 11 is a perspective view of the assembly with the belt clip engaged in an arm band;

FIG. 12 is a rear elevation of a fully assembled encasement for an iPhone smart phone device;

FIG. 13 is a left side elevation thereof;

FIG. 14 is a bottom view showing an opening for a data and power cord plug;

FIG. 15 is a front elevation thereof;

FIG. 16 is a right side elevation thereof;

FIG. 17 is a top view showing an opening for a power button and for an ear phone mini jack;

FIG. 18 is an exploded view showing the lower shell, the upper shell, and two backwall assemblies for an iPhone casing;

FIG. 19 is a perspective view of an armband loop that allows the belt clip of FIG. 18 to clip onto an armband; and FIG. 20 is a perspective view of a back panel with a cord management clip that also attaches to an armband.

DESCRIPTION OF A PREFERRED EMBODIMENT OF THE INVENTION

Figure 1:
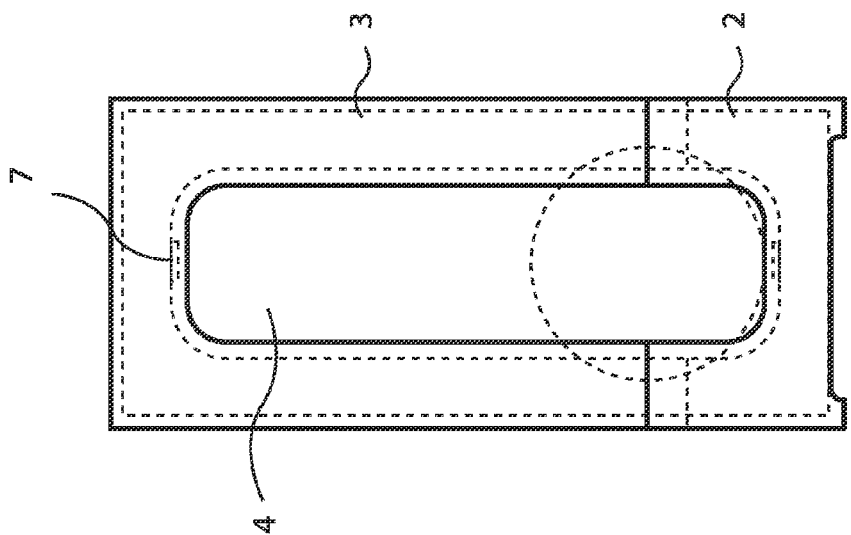
FIG. 1 is a front elevation view of an exemplary iPod casing according to the invention.
Figure 2:
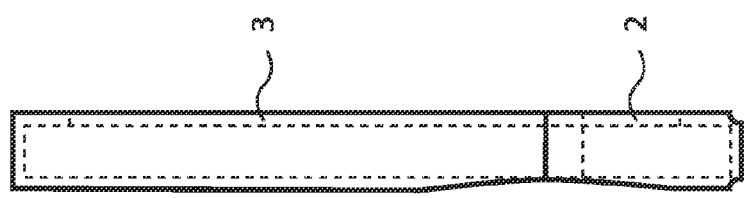
FIG. 2 is a right side elevation view thereof.
Figure 3:
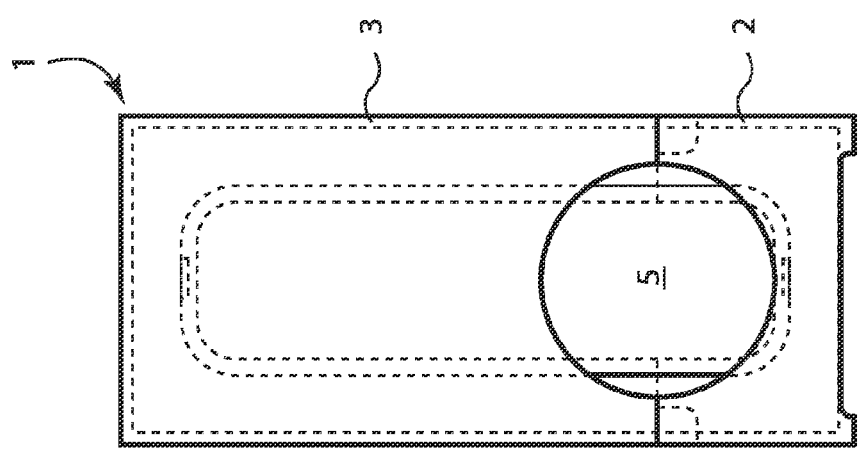
FIG. 3 is a rear elevation view thereof.
Figure 4:
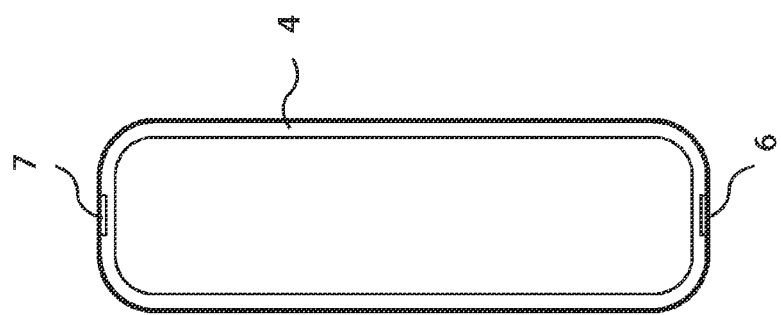
FIG. 4 is an elevation view of a removed back panel.

Referring now to the figures of the drawing in detail and first, particularly, to FIGS. 1-4 thereof, there is seen an exemplary casing that is specifically adapted to house an iPod. The casing 1 is formed of clear polycarbonate or any other suitable material. Even recycled plastics are being considered and any color, scheme or additional ornamentation may be provided. The casing 1 is formed of three primary parts, namely, a lower sleeve 2, an upper sleeve 3, and a removable back panel 4.

The lower sleeve 2 and the upper sleeve 3 are each provided with a semi-circular cutout in the front wall which, when the sleeves 2 and 3 are disposed on the iPod, together form a circular round opening 5 providing access to the iPod control panel. It will be understood that the opening may be covered with a relatively thin plastic layer, through which the controls may still be operated. The upper sleeve 3 is also formed with an access opening at the top left corner, which enables access to the on/off switch of the iPod.

With reference to FIGS. 5-8, the sleeves 2, 3 fit tightly over the iPod. It is not necessary to provide any other structural supports in order to form a sturdy encasement when the sleeves 2, 3 are slid onto the iPod. The removable back panel 4, however, is provided with two notch engagements 6, 7, which allow the panel to snap in place with the lower sleeve 2 and the upper sleeve 3, respectively.

The sleeves 2 and 3 are formed with a slide groove 8 and 9, respectively. The removable back panel 4 is formed with a correspondingly formed frame bulge 10. The frame bulge 10 slides inside the grooves 8 and 9 and, once the case 1 is assembled, the back panel is held in place by the interaction between the bulge 10 and the slide grooves 8, 9. In addition, the sleeves 8, 9 are then held against sliding apart and coming off the iPod due to the snap action provided by the snap lock 7 and by the frictional resistance offered by the iPod.

The back panel 4 may be provided with any of a number of different attachment mechanisms. As illustrated, for example, in FIGS. 9-11, the panel may be provided with a belt clip 11. Similarly, there may be provided a simple strap loop or a magnet, or a similar device. The novel system here is that the alternative attachment mechanism is provided as a unitary structure with/on the back panel 4. In order to provide an attachment device, or a different attachment device, for that matter, the back panel itself is replaced by an alternative unit. That is, the attachment device is an integral part of the iPod casing 1. In other words, the three components 2, 3, and 4 together form a complete encasement.

Turning now to FIGS. 12-17, which illustrate a casing for an iPhone, the casing includes a lower sleeve 12, an upper sleeve 13, and a back panel 14. These three components can also be snapped into mutual engagement, similarly to the description provided above with regard to the iPod casing. For that purpose, the back panel 14 is provided with two ramps 16 and 17, which snap into corresponding recesses formed in the lower and upper sleeves 12 and 13, respectively. In addition, the upper and lower sleeves 12 and 13 are also snapped together by way of the snap closures 25/26 in/on the sidewalls of the casing. As illustrated in FIG. 18, the snap closures may be formed by a ramp projection 25, or a nose 25, that snaps into and engages with a recess 26 formed in the opposite component. The ramp projection 25 is formed on a wall extension on the lower sleeve 12 that slides inside the lower portion of the upper sleeve 13. The lower portion of the upper sleeve 13 may, for this purpose, be slightly indented so as to accommodate the wall extension.

The cutout in the back of the casing, which is formed by a U-shaped cutout in the lower sleeve 12 and a U-shaped cutout in the upper sleeve 13, is formed with an undercut defining slide tracks 18 and 19 that accommodate an engagement and slide bulge 20 on the margins of the backwall 14.

The upper sleeve is formed with an opening 27 for the camera of the iPhone, with an opening 28 for allowing access to the power switch, an opening 29 for allowing access to the ear phone and microphone mini jack, and with an opening 30 on the left side for the volume controls.

The lower sleeve is formed with an opening 31 for allowing access to the power and data connection port of the iPhone.

With reference to FIG. 18, the exchangeable back panel 14 may either be a smooth plate or it may carry any of a multiplicity of functional assemblies. Here, there is provided a spring-loaded belt clip 21 forming an alternative to the smooth backwall panel 14. The belt clip 21, furthermore, is rotatably mounted on its base panel 14, so as to allow its rotation about an axis that is substantially perpendicular to the backwall panel 14. Also, the belt clip 21 is formed so as to allow the iPhone to be placed onto a desk surface, for instance, with the viewing screen in a near-vertical or slightly rearwardly inclined position.

FIG. 19 shows an armband loop subassembly 22. The subassembly 22 may be attached to an armband or a belt that extends through the openings 24. The belt clip 21 then slides over the middle portion of the subassembly 22 so as to securely hold the casing with the iPhone on the armband or belt, yet render the same easily removable.

FIG. 20 illustrates a cord management clip 23. The device is again mounted to a backwall panel 14, which is further enabled to be attached to a belt or an armband by way of the elongate opening 24 formed therein.

The terms iPod® and iPhone® are registered trademarks of Apple, Inc. of Cupertino, Calif.

The invention claimed is:

1. A function-convertible casing for a portable electronic device, comprising:
   a plurality of sleeves to be placed onto the electronic device and together forming a closed encasement for the electronic device when said sleeves are placed on the electronic device, each of said sleeves being formed with a respective opening in a backwall thereof, said opening in each of said sleeves together forming a backwall opening of the casing when said sleeves are assembled to form the closed encasement;
   at least one of said sleeves being formed to enable operative access to the electronic device while said sleeves are connected to form said closed encasement; and
   a plurality of removable back panels each being formed to completely close said backwall opening, said plurality of removable back panels including a substantially planar first back panel forming an integral backwall part of said closed encasement and a second back panel carrying an attachment device for carrying said encasement with the electronic device disposed therein, wherein said plurality of removable back panels may be exchanged with each other to provide the device for mutually different functions of the casing.

2. The casing according to claim 1, wherein said removable back panel and said sleeves are formed with snap connections holding said sleeves in place on the electronic device to maintain the closed encasement.

3. The casing according to claim 1, wherein said plurality of sleeves are formed with snap connections enabling said sleeves to engage with one another in a position when said sleeves are assembled to form the closed encasement.

4. The casing according to claim 1, wherein said openings in said sleeves are formed with an undercut forming a slide track and said back panel is formed with a marginal slide bulge configured to slidably engage in said slide track.

* * * * *